United States Patent
Li

(10) Patent No.: US 11,335,297 B2
(45) Date of Patent: May 17, 2022

(54) METHOD FOR DISPLAYING PROJECTION PICTURE AND METHOD FOR ROTATING PROJECTION PICTURE

(71) Applicant: SHENZHEN YINGCHUANG TECHNOLOGY CO., LTD., Shenzhen (CN)

(72) Inventor: Jie Li, Fuyang (CN)

(73) Assignee: SHENZHEN YINGCHUANG TECHNOLOGY CO., LTD., Shenzhen (CN)

( * ) Notice: Subject to any disclaimer, the term of this patent is extended or adjusted under 35 U.S.C. 154(b) by 13 days.

(21) Appl. No.: 16/695,263

(22) Filed: Nov. 26, 2019

(65) Prior Publication Data

US 2021/0027742 A1    Jan. 28, 2021

(30) Foreign Application Priority Data

Jul. 24, 2019    (CN) .......................... 201910673052.8

(51) Int. Cl.
| | |
|---|---|
| *G09G 5/00* | (2006.01) |
| *G06F 3/14* | (2006.01) |
| *H04N 21/4402* | (2011.01) |
| *H04N 21/2343* | (2011.01) |
| *H04N 21/41* | (2011.01) |

(52) U.S. Cl.
CPC .......... *G09G 5/005* (2013.01); *G06F 3/1454* (2013.01); *H04N 21/234363* (2013.01); *H04N 21/234372* (2013.01); *H04N 21/4126* (2013.01); *H04N 21/4402* (2013.01); *H04N 21/440263* (2013.01);
(Continued)

(58) Field of Classification Search
CPC .... G09G 5/005; G09G 5/12; G09G 2340/045; G09G 2340/0492; H04N 21/234363; H04N 21/234272; H04N 21/4402; H04N 21/440263; H04N 21/440272; G06F 3/1454
See application file for complete search history.

(56) References Cited

U.S. PATENT DOCUMENTS

| | | | | |
|---|---|---|---|---|
| 6,400,852 B1 * | 6/2002 | Miller, II | ............... | G06T 3/4007 345/660 |
| 2009/0274393 A1 * | 11/2009 | Patel | .................... | H04N 1/3873 382/298 |

(Continued)

*Primary Examiner* — King Y Poon
*Assistant Examiner* — Vincent Peren
(74) *Attorney, Agent, or Firm* — Li & Cai Intellectual Property (USA) Office

(57) ABSTRACT

Disclosed are a method for displaying projection picture and a method for rotating projection picture, comprising following steps: A: using a main control chip of a display to receive a picture signal parameter of a handheld terminal; B: the main control chip determining the black edge and calculating the starting position of a display picture by detecting the intensity of display signal inputted from the handheld terminal; C: obtaining the width of the display picture by calculation, and at the same time, directly obtaining the height of the display signal by signal detection of the main control chip; and D: using the function calculation provided by a control unit to enlarge the picture to a proportional or full-screen output with the handheld terminal. After adopting the above method, the display provides a picture with "full screen without having black edges" or "small black edges" to enhance the visual experience.

12 Claims, 1 Drawing Sheet

(52) U.S. Cl.
    CPC ............. *H04N 21/440272* (2013.01); *G09G 2340/045* (2013.01); *G09G 2340/0492* (2013.01)

(56) References Cited

U.S. PATENT DOCUMENTS

| | | | |
|---|---|---|---|
| 2011/0216937 A1* | 9/2011 | Radhakrishnan | G06K 9/525 382/100 |
| 2014/0358981 A1* | 12/2014 | Miyake | H04L 67/1095 709/201 |
| 2017/0249919 A1* | 8/2017 | Bae | G06F 3/1454 |
| 2020/0073455 A1* | 3/2020 | Na | G06F 13/4282 |

* cited by examiner

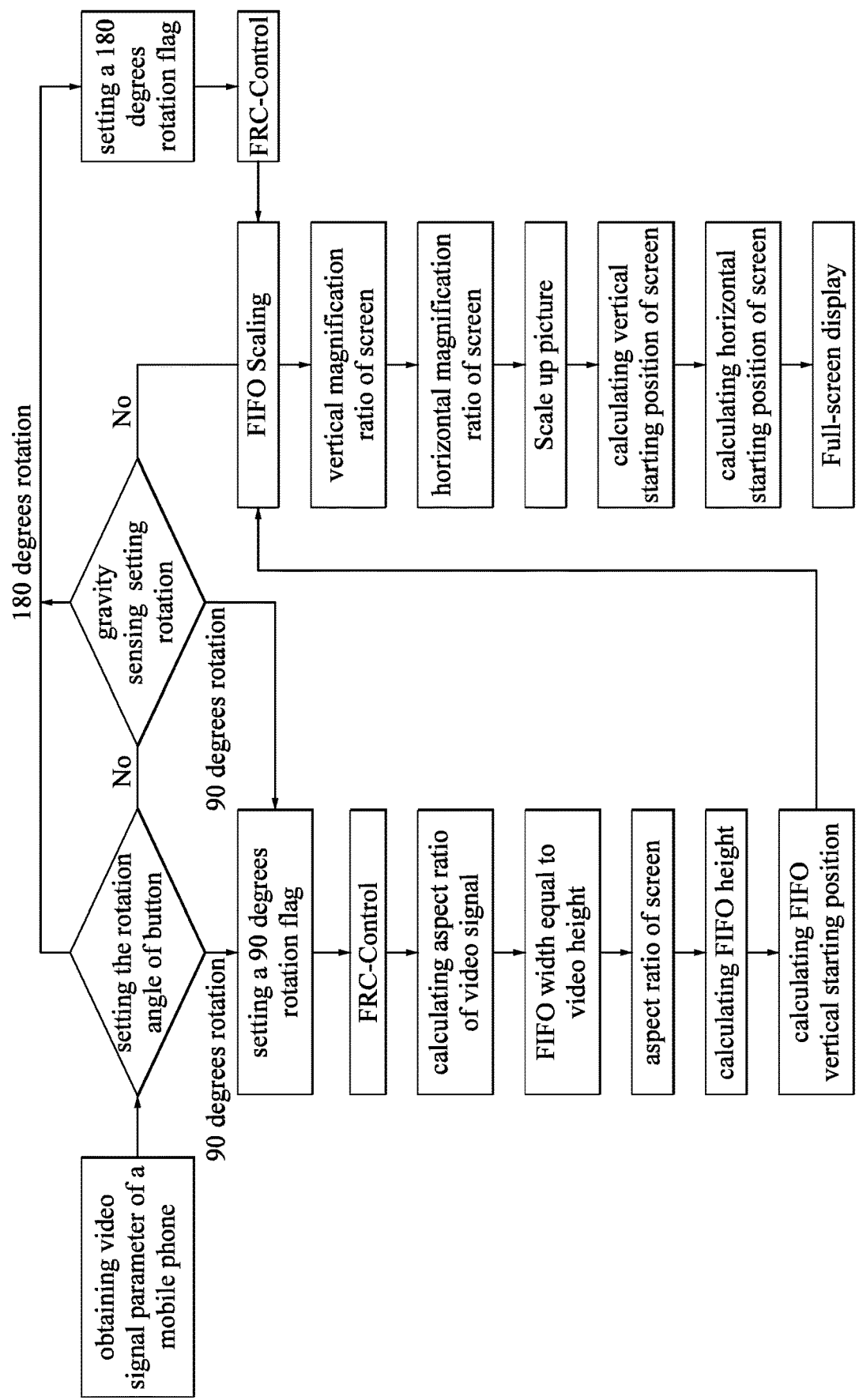

METHOD FOR DISPLAYING PROJECTION PICTURE AND METHOD FOR ROTATING PROJECTION PICTURE

FIELD OF THE DISCLOSURE

The present disclosure relates to an information display technology, and more particularly to a method for displaying projection picture and a method for rotating projection picture.

BACKGROUND OF THE DISCLOSURE

In the prior art, projecting picture between a mobile phone and a display to facilitate a same picture displaying between the mobile phone screen or the video screen and the display picture has become an increasingly popular entertainment mode. However, because the screen size ratio of the mobile phone does not match the screen size ratio of the display, after the picture displayed on the mobile phone is projected on the display, it can only display the same size as the mobile phone, so that black edges appear on the left and right sides of the display, which affects the user's visual experience. Consequently, how to eliminate the black edge appearing on the display so as to improve the visual experience becomes a difficult technical problem.

SUMMARY OF THE DISCLOSURE

The technical problem to be solved by the present disclosure is to provide a method for displaying projection picture and a method for rotating projection picture capable of effectively eliminating the black edge of the display at the time of projecting picture, thereby improving the visual experience.

For resolving the aforementioned technical problem, a method for displaying projection picture is provided, comprising the following steps:

A: using a main control chip of a display to receive a picture signal parameter of a handheld terminal;

B: the main control chip determining the black edge and calculating a starting position of a display picture by detecting an intensity of a display signal inputted from the handheld terminal;

C: obtaining a width of the display picture by calculation, and at the same time, directly obtaining a height of the display signal by signal detection of the main control chip; and D: using the function calculation provided by a control unit to enlarge the picture to a proportional or full-screen output with the handheld terminal.

In the step B, the resolution of the signal is detected while the main control chip detects the intensity of the display signal.

The handheld terminal transmits information through a USB TYPE-C and the main control chip of the display.

In the step D, one of edges of a screen is used as a reference for picture output during the proportional output.

The handheld terminal is a mobile phone or a tablet computer.

A method for rotating projection picture is provided, comprising: the following steps:

A: setting a rotation angle flag by using a setting parameter or gravity sensing according to an obtained picture signal;

B: after a frame rate conversion control, determining a vertical magnification ratio and a horizontal magnification ratio of a screen through FIFO picture scaling, and then scaling a picture; and C: calculating a vertical starting position and a horizontal starting position of the screen display, and finally performing a full-screen display after a rotation.

When the rotation is 90 or 270 degrees, a 90 or a 270 degree flag is set by using a setting parameter according to the obtained picture signal; after a frame rate conversion control and before a FIFO picture scaling, an aspect ratio of the display signal needs to be calculated and a FIFO width needs to be equal to a height of a video, and then the aspect ratio of the screen is determined and the FIFO height and the vertical starting position are calculated.

When the rotation is 180 degrees, a 180 degree flag is set by using a setting parameter according to the obtained picture signal.

The gravity sensing is to acquire a sensing signal by using a detecting device provided by the handheld terminal.

After adopting the above method, the picture transmitted by the mobile phone is through USB TYPE-C, the receiving part of the board is a DP signal, and the main control chip of the board can detect the intensity of the display signal and the resolution of the signal, so that the black edge and the starting position of the screen and the resolution of the picture having no black edge can be determined through mathematical calculation. In addition, by using one of the edges as a reference, the picture display scale distortion is effectively prevented, and the effect of the picture display is ensured. Furthermore, the rotation angle flag is set by using the setting parameter or the gravity sensing according to the obtained picture signal, the main control chip obtains the rotation of the picture after the corresponding processing, then the picture is rotated to the corresponding angle, and the rotated picture is displayed through the display screen, so that the subsequent picture becomes a "full screen without having black edge" or a picture having "small black edge" on the display, thereby improving the visual experience.

BRIEF DESCRIPTION OF THE DRAWINGS

FIG. 1 is a flow chart of a method for rotating projection picture according to the present disclosure.

DETAILED DESCRIPTION OF THE EXEMPLARY EMBODIMENTS

The method for displaying projection picture and the method for rotating projection picture of the present disclosure are further described in detail below with reference to the accompanying drawings and specific embodiments. The picture mentioned in this embodiment may be an image picture or a video picture, and embodiments do not specifically limit thereto.

Embodiment 1

The method for displaying projection picture of the present disclosure comprises the following steps.

A. A main control chip of a display is used to receive a picture signal parameter of a handheld terminal.

B. The main control chip determines the black edge and calculates the starting position of a display picture by detecting the intensity of display signal inputted from the handheld terminal (R, G, B, the normal signal strength is 0~255, the signal strength value of black picture is small, and the general black data signal does not exceed 16, usually less than 3) through the mathematical calculation (specifically refers to the calculation by the cumulative calculation method; in the same position, the cumulative value of the points of consecutive 3 to 5 rows are greater than 3, then it is considered that the starting position of the picture is found); at the same time, the main control chip also detects the resolution of the signal (such as: 1080 (horizontal pixels)×1920 (vertical pixels)), while mathematically obtains the resolution of the picture having no black edge (e.g. 720×1280), and the resolution of the signal can be directly read by the register of the main control chip, where the resolution is the resolution of the calculated "width of the picture×the height of the signal". Specifically, from left to right: the position of the black edge on the right side is detected—the position of the left picture is detected, which is the width of the picture, and the width of the resolution of the picture to be enlarged is denoted by H to indicate that the height of the picture can be read by the register of the main control chip directly as described above, which is denoted by V. H×V is the resolution to be amplified.

C. The width of the display picture (horizontal signal) is obtained by calculation (the calculation method is similar to step B, and the difference is that the cumulative value of the points of consecutive 3 to 5 rows are less than 3, then it is considered that the ending position of the picture is found, and the ending position is used to subtract the starting position, which is equal to the width of the screen), and at the same time, the height of the display signal (vertical signal) is directly obtained by signal detection of the main control chip (the hardware register of the main control chip can directly read how many lines of the input signal screen, which is the height of the screen).

Among them, the resolution of the matching display screen is fixed (according to different display screens, this is set based on the specifications of the display screen), and the aspect ratio is also fixed (e.g., 16:9, 4:3).

D. The function calculation provided by a control unit is used to enlarge the picture to a proportional or full-screen output with the handheld terminal. The specific calculation method is as follows. It is supposed that the width of the input signal is 720 pixels, the height is 1280 lines, and the resolution of the display picture is 1920×1080. The calculation method is as follows. The picture width enlargement coefficient is: 1080/720, and the picture height enlargement coefficient is 1920/1280, in which the two numbers are compared and the smaller data is used as the amplification factor, so the picture can be enlarged. The insufficient position (high or width) of the output picture can be filled in black, which means that only the normal display signal (the picture without having black edge) can be enlarged to the display resolution of the screen. One of the edges of the screen is used as a reference for the picture output during the proportional output, that is, as long as it is up and down or left and right, there is a side to the edge of the display screen, which can prevent the picture display from being distorted.

Further, the main control chip is a main control chip of the board, and the receiving part of the board is a DP signal. The picture transmitted by the handheld terminal is through the USB TYPE-C and the main control chip of the display. The handheld terminal is a mobile phone or a tablet, but is not limited to a mobile phone or a tablet.

It should be noted that in the full-screen display, there may be a "small black edge" picture, which is related to the aspect ratio of the mobile phone signal and the aspect ratio of the panel, but the traditional picture having large black edge is completely eliminated.

Embodiment 2

As shown in the FIGURE, the method for rotating projection picture in the embodiment comprises the following steps.

A. A rotation angle flag is set by using a setting parameter or gravity sensing according to an obtained picture signal.

B. After a frame rate conversion control, an aspect ratio of the picture signal is calculated and the FIFO width is made to be equal to the width of the video (the calculation method can be referred to Embodiment 1).

C. An aspect ratio of the screen is determined and the FIFO height and a vertical starting position are calculated.

D. After the FIFO picture is scaled, the vertical magnification ratio and the horizontal magnification ratio of the screen are determined, and then the picture is scaled.

E. The vertical starting position and the horizontal starting position of the screen display (display that the main control chip can cache the picture) are calculated, and finally a full-screen display is performed after a rotation.

Embodiment 3

As shown in the FIGURE, the method for rotating projection picture in this embodiment comprises the following steps.

A. A 180 degree flag is set by using a setting parameter according to the obtained picture signal, wherein the gravity sensing is to acquire a sensing signal by using a detecting device provided by the handheld terminal.

B. After a frame rate conversion control, the vertical magnification ratio and the horizontal magnification ratio of the screen are determined through FIFO picture scaling, and then the picture is scaled.

C. The vertical starting position and the horizontal starting position of the screen display are calculated, and after the picture is rotated, the main control chip rotates the picture to the corresponding angle, and then performs a full-screen display after the rotation.

In addition, it should be noted that the method of setting parameters can also be used to achieve a 180 degree rotation, and the gravity sensing can also be used to achieve a 90 or a 270 degree rotation. In the second embodiment and the third embodiment, when the handheld terminal itself has black edge, the corresponding display screen also has the same proportion of black edges, that is, the handheld terminal and the display screen are displayed in proportion.

What is claimed is:

1. A method for displaying projection picture, comprising the following steps:

A: using a main control chip of a display to receive a picture signal from a handheld terminal, wherein the picture signal includes a picture signal parameter, wherein the picture signal parameter includes an intensity, a signal strength value, or a resolution, and wherein a display picture corresponding to the picture signal is displayed on the display;

B: the main control chip determining a black edge and calculating a starting position of the display picture by detecting the intensity of the picture signal received from the handheld terminal;

C: obtaining a width of the display picture by calculation, and at the same time, directly obtaining a height of the display picture from the picture signal by signal detection of the main control chip;

D: using a function calculation provided by the main control chip of the display to enlarge the display picture to generate an output image that either matches a full-screen image of the handheld terminal or that is proportional to the full-screen image of the handheld terminal;

E: setting a rotation angle by using a setting parameter or gravity sensing according to the received picture signal;

F: after a frame rate conversion control, determining a vertical magnification ratio and a horizontal magnification ratio of a screen of the display through a scaling process using a FIFO, and then scaling the output image to generate the display picture; and G: calculating a vertical starting position and a horizontal starting position of the screen of the display, and finally performing a full-screen display of the display picture on the display;

wherein when the rotation angle is 90 or 270 degrees, a 90 or a 270 degree flag is set by using the setting parameter according to the received picture signal; and wherein, after the frame rate conversion control and before the scaling process, when an aspect ratio of the picture signal is calculated and a scaling width is equal to a height of the picture signal, an aspect ratio of the screen of the display is determined and a scaling height and the vertical starting position are calculated.

2. The method according to claim 1, wherein the handheld terminal is a mobile phone or a tablet computer.

3. The method according to claim 1, wherein when the rotation angle is 180 degrees, a 180 degree flag is set by using the setting parameter according to the received picture signal.

4. The method according to claim 1, wherein the gravity sensing acquires a sensing signal by using a detecting device provided by the handheld terminal.

5. The method according to claim 1, wherein the handheld terminal transmits information through a USB TYPE-C and the main control chip of the display.

6. The method according to claim 5, wherein in the step D, an edge of the screen of the display is used as a reference for the display picture output during proportional output.

7. The method according to claim 6, wherein the handheld terminal is a mobile phone or a tablet computer.

8. The method according to claim 1, wherein in the step B, the resolution included in the picture signal is detected while the main control chip detects the intensity from the picture signal.

9. The method according to claim 8, wherein the handheld terminal is a mobile phone or a tablet computer.

10. The method according to claim 8, wherein the handheld terminal transmits information through a USB TYPE-C and the main control chip of the display.

11. The method according to claim 10, wherein in the step D, an edge of the screen of the display is used as a reference for the display picture output during proportional output.

12. The method according to claim 11, wherein the handheld terminal is a mobile phone or a tablet computer.

* * * * *